US012666487B2

(12) United States Patent (10) Patent No.: US 12,666,487 B2
Zhang et al. (45) Date of Patent: Jun. 23, 2026

(54) METHOD PERFORMED BY USER EQUIPMENT, AND USER EQUIPMENT

(71) Applicant: Sharp Kabushiki Kaisha, Sakai City (JP)

(72) Inventors: Chongming Zhang, Shanghai (CN); Renmao Liu, Shanghai (CN); Fangying Xiao, Shanghai (CN)

(73) Assignee: SHARP KABUSHIKI KAISHA, Sakai City (JP)

( * ) Notice: Subject to any disclaimer, the term of this patent is extended or adjusted under 35 U.S.C. 154(b) by 392 days.

(21) Appl. No.: 17/913,908

(22) PCT Filed: Mar. 15, 2021

(86) PCT No.: PCT/CN2021/080743
§ 371 (c)(1),
(2) Date: Sep. 23, 2022

(87) PCT Pub. No.: WO2021/197036
PCT Pub. Date: Oct. 7, 2021

(65) Prior Publication Data
US 2024/0215096 A1 Jun. 27, 2024

(30) Foreign Application Priority Data
Apr. 1, 2020 (CN) .......................... 202010252755.6

(51) Int. Cl.
*H04W 76/19* (2018.01)
*H04W 76/27* (2018.01)
*H04W 80/08* (2009.01)
(52) U.S. Cl.
CPC ........... *H04W 76/19* (2018.02); *H04W 76/27* (2018.02); *H04W 80/08* (2013.01)

(58) Field of Classification Search
CPC ...... H04W 76/19; H04W 76/27; H04W 80/08
See application file for complete search history.

(56) References Cited

U.S. PATENT DOCUMENTS

2019/0380154 A1* 12/2019 Wei .................. H04W 74/0833
2021/0297931 A1 9/2021 Zhang et al.
(Continued)

FOREIGN PATENT DOCUMENTS

CN 109936878 A 6/2019
CN 110035495 A 7/2019
(Continued)

OTHER PUBLICATIONS

Official Communication issued in International Patent Application No. PCT/CN2021/080743, mailed on May 31, 2021.

*Primary Examiner* — James P Duffy
(74) *Attorney, Agent, or Firm* — Keating & Bennett, LLP

(57) ABSTRACT

Provided in the present invention are a method performed by user equipment, and user equipment. The method performed by user equipment includes: in the case that the user equipment is in an inactive state and needs to perform small data transmission, triggering a radio resource control (RRC) connection resumption procedure; and in the RRC connection resumption procedure, using, by the user equipment, a predefined default configuration for a data radio bearer (DRB), and restoring configurations in RRC configurations for the DRB other than the default configuration. Therefore, in the case that user equipment is in an inactive state and needs to perform small data transmission, additional signaling overhead can be avoided, and power consumption can be reduced, thereby improving communication efficiency and reliability of a wireless communication system.

2 Claims, 2 Drawing Sheets

(56)  References Cited

U.S. PATENT DOCUMENTS

2021/0337602  A1*  10/2021  Liu  ....................... H04W 28/26
2023/0180340  A1*   6/2023  Yue  ....................... H04W 76/27
                                                   370/328

FOREIGN PATENT DOCUMENTS

| | | |
|---|---|---|
| CN | 110784904  A | 2/2020 |
| EP | 4165900  A1 | 4/2023 |
| EP | 4165939  A1 | 4/2023 |
| EP | 4201141  A1 | 6/2023 |
| WO | 2014/182338  A1 | 11/2014 |
| WO | 2022/014972  A1 | 1/2022 |
| WO | 2022/015028  A1 | 1/2022 |
| WO | 2022060005  A1 | 3/2022 |

* cited by examiner

<u>100</u>

<u>200</u>

UE30

METHOD PERFORMED BY USER EQUIPMENT, AND USER EQUIPMENT

TECHNICAL FIELD

The present invention relates to the technical field of wireless communications. More specifically, the present invention relates to a method performed by user equipment, and a corresponding base station and user equipment.

BACKGROUND

To shorten a transmission latency and to reduce signaling overhead, UE entering an RRC inactive state may transmit, on a preconfigured uplink resource (PUR), a transport block having a predetermined size and carrying data. Such a transmission manner may be referred to as PUR transmission. A transport block carrying user data may also be transmitted in a message three or a message A during a random access procedure. Both of the two manners may be referred to as small data transmission.

In order to enable UE to perform data transmission in an inactive state, the UE first needs to resume a DRB. The UE restores the RRC configuration from the stored UE access stratum (AS) context, restores a PDCP state, and then reestablishes a PDCP entity, thereby resuming a DRB.

With the preparation described above, the UE may then perform small data transmission in a currently resident cell. Such a cell may be referred to as a cell that provides a small data transmission service. In such a cell, the UE may obtain a preconfigured uplink resource, or may obtain a random access resource on the basis of system information broadcast in the cell, so as to perform small data transmission.

However, the following situation may occur during preparation of small data transmission:

Before entering the inactive state, the UE is configured with an allowed serving cell list (allowedServingCells), and in allowedServingCells, information of a serving cell, such as an index number, is recorded. When a logical channel is configured with allowedServingCells, data from the logical channel can only be transmitted via a serving cell recorded in allowedServingCells.

Similarly, the UE may also be configured with an allowed subcarrier spacing list (allowedSCS-List), and in allowed-SCS-List, allowed subcarrier spacings are recorded. When a logical channel is configured with allowedSCS-List, data from the logical channel can only be transmitted via a physical resource satisfying a subcarrier spacing recorded in allowedSCS-List.

Each DRB is associated with at least one logical channel. To resume the DRB, the UE restores the previous RRC configurations, but the resource configurations of a cell currently providing the small data transmission service may not match those in the previous RRC configurations.

For example, the cell currently providing the service is not a cell in allowedServingCells.

As another example, a subcarrier spacing of the current cell is not in allowedSCS-List.

As a result, although the UE resumes transmission of the DRB, the physical resource of the lower layer cannot satisfy the existing RRC configuration, so that data arriving from the DRB cannot be transmitted on the cell currently providing the small data transmission. In order to transmit data, the UE has to enter a connected state again, thus causing additional signaling overhead and increasing power consumption. Therefore, this is a problem that needs to be solved in performing small data transmission.

SUMMARY

In order to solve the above problems in the prior art, provided in the present invention are a method performed by user equipment and user equipment, which can avoid additional signaling overhead and reduce power consumption in the case that user equipment is in an inactive state and needs to perform small data transmission, thereby improving communication efficiency and reliability of a wireless communication system.

According to a first aspect of the present invention, provided is a method performed by user equipment, comprising: in the case that the user equipment is in an inactive state and needs to perform small data transmission, triggering a radio resource control (RRC) connection resumption procedure by the user equipment; and in the RRC connection resumption procedure, using, by the user equipment, a predefined default configuration for a data radio bearer (DRB), and restoring configurations in RRC configurations for the DRB other than the default configuration.

In the above method, alternatively, the default configuration comprises at least one of a default radio link control (RLC) bearer configuration and a default packet data convergence protocol (PDCP) configuration, for a parameter in the default RLC bearer configuration, a value configured in the default RLC bearer configuration is used, and for a parameter in the default PDCP configuration, a value configured in the default PDCP configuration is used.

In the above method, alternatively, after resuming all DRBs, the user equipment transmits an RRC connection resume request message to a network side.

According to a second aspect of the present invention, provided is a method performed by user equipment, comprising: in the case that the user equipment is in an inactive state and needs to perform small data transmission, triggering a radio resource control (RRC) connection resumption procedure; and in the RRC connection resumption procedure, restoring, by the user equipment, a relevant RRC configuration of a data radio bearer (DRB) supporting the small data transmission.

In the above method, alternatively, RRC configuration message received by the user equipment in a connected state comprises indication information indicating that the DRB supports the small data transmission.

In the above method, alternatively, request information transmitted by the user equipment to a network side or response information received from the network side and related to request information comprises relevant information of the DRB supporting the small data transmission.

In the above method, alternatively, the user equipment is configured with one or more dedicated DRBs only used for the small data transmission in the inactive state, and in the case that the user equipment is in the inactive state, a Service Data Adaptation Protocol Service Data Unit (SDAP SDU) from an upper layer is transmitted to the dedicated DRBs.

In the above method, alternatively, when a Qos flow to DRB mapping rule is present, the SDAP SDU is transmitted to a corresponding DRB in the dedicated DRBs according to the mapping rule, and when the mapping rule is not present, the SDAP SDU is transmitted to a default DRB in the dedicated DRBs.

In the above method, alternatively, the user equipment determines that the small data transmission can be performed only when data from the upper layer comes from the DRB supporting the small data transmission.

According to a third aspect of the present invention, provided is user equipment, comprising: a processor; and a memory storing instructions, wherein the instructions, when run by the processor, perform the above method.

Effect of Invention

The method performed by user equipment and the user equipment according to the present invention can avoid additional signaling overhead and reduce power consumption in the case that the user equipment in an inactive state needs to perform small data transmission, thereby improving communication efficiency and reliability of a wireless communication system.

BRIEF DESCRIPTION OF THE DRAWINGS

The above and other features of the present invention will be more apparent from the following detailed description in combination with the accompanying drawings, in which.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
LTE: Long Term Evolution
eLTE: enhanced Long Term Evolution
RRC: Radio Resource Control (layer)
MAC: Medium Access Control (layer)
PUSCH: Physical Uplink Shared Channel
PDCCH: Physical Downlink Control Channel
RNA: RAN-based Notification Area
SDAP: Service Data Adaptation Protocol A plurality of embodiments according to the present invention are specifically described below, with an NR mobile communications system and its subsequent evolved version serving as exemplary application environments, and with a base station and UE that support NR serving as examples. However, it should be noted that the present invention is not limited to the following embodiments, but is applicable to more other wireless communications systems, such as an eLTE communication system, or an NB-Iot system, or an LTE-M system. Moreover, the present invention may be applicable to other base stations and user equipment, such as base stations and user equipment supporting eLTE/NB-Iot/LTE-M.

When UE is in an INACTIVE state, an upper layer of the UE, e.g., a non-access stratum, may request the UE to resume an RRC connection. Such a request typically occurs when data arrives at the upper layer. In addition, an access stratum of the UE, e.g., an RRC layer, may also request the UE to resume an RRC connection. Such a request typically occurs when RNAU is triggered or the UE receives a paging message from a network side in the INACTIVE state.

On the basis of this request, the UE triggers an RRC connection resumption procedure. In this procedure, the UE transmits an RRC connection resume request message to the base station/network side.

If the UE supports and decides to use a small data transmission manner, then the UE may transmit a MAC PDU in a PUR or random access procedure, and the MAC PDU carries the RRC connection resume request message and data of a user.

In the RRC connection resumption procedure, if the UE uses the small data transmission manner, then the UE needs to resume a DRB first.

Figure 1:
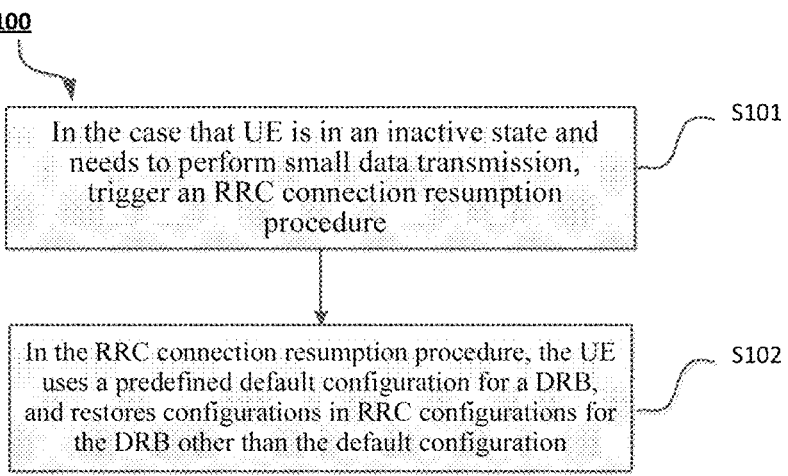
FIG. 1 shows a flowchart of a method 100 applied to user equipment according to an embodiment of the present invention.

FIG. 1 shows a flowchart of a method 100 applied to user equipment according to an embodiment of the present invention. In step S101, in the case that the user equipment is in an inactive state and needs to perform small data transmission, the user equipment triggers an RRC connection resumption procedure. In step S102, in the RRC connection resumption procedure, the user equipment uses a predefined default configuration for a DRB, and restores configurations in RRC configurations for the DRB other than the default configuration.

Figure 2:
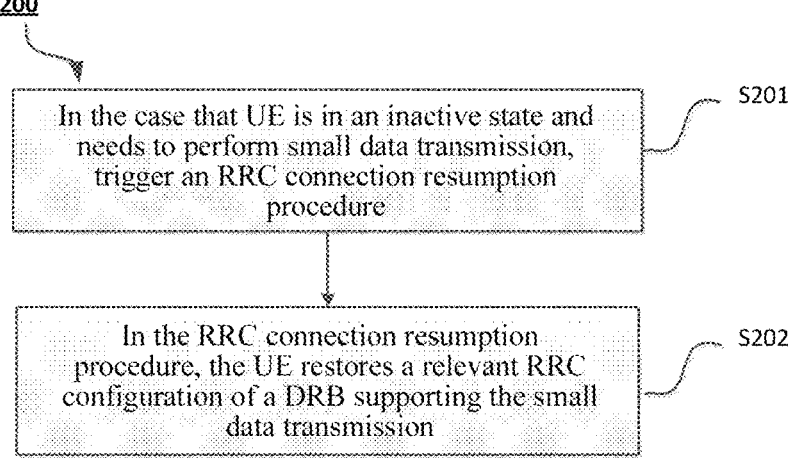
FIG. 2 shows a flowchart of a method 200 applied to user equipment according to an embodiment of the present invention.

FIG. 2 shows a flowchart of a method 200 applied to user equipment according to an embodiment of the present invention. In step S201, in the case that the user equipment is in an inactive state and needs to perform small data transmission, the user equipment triggers an RRC connection resumption procedure. In step S202, in the RRC connection resumption procedure, the user equipment restores a relevant RRC configuration of a DRB supporting the small data transmission.

According to the above method, in the case that user equipment is in an inactive state and needs to perform small data transmission, additional signaling overhead can be avoided, and power consumption can be reduced, thereby improving communication efficiency and reliability of a wireless communication system.

In order to solve the above problems in the prior art, several embodiments of the present invention are described in detail below.

Embodiment 1

A default RLC bearer configuration (default RLC-BearerConfig) is defined. This configuration information element (IE) includes at least the following parameters or fields. The so-called field refers to individual content in the information element. One information element may include multiple fields.

allowedServingCells, the value of this field being set to empty, or a default state, or a not present state.

allowedSCS-List, the value of this field being set to empty, or a default state, or a not present state.

Due to the above configuration method, a DRB using the above default RLC bearer configuration is not restricted by allowedServingCells or allowedSCS-List, and can operate properly in a serving cell providing small data transmission.

A default PDCP configuration (default PDCP config) is defined, and this configuration includes at least the following parameters or fields.

primary Path, this field being set to MCG or empty.

pdcp-Duplication, this field being set to deactivated, or set to empty, indicating that this field is not configured.

Due to the above configuration method, when a DRB uses the above default PDCP configuration, a primary transmission path thereof is an MCG or a serving cell providing small data transmission.

When an RRC connection resumption procedure is triggered, UE restores RRC configurations, but does not restore all RRC configurations. A specific method may be:

For an information element RLC-BearerConfig in an RRC configuration stored by UE, for those fields that are present in the default RLC bearer configuration, such as allowedServingCells or allowedSCS-ListUE described above, configured values of these fields in the default RLC bearer configuration may be used, and for those fields that are not present in the default RLC bearer configuration, such as a logical channel ID, an RLC entity state, etc., original values of these fields in an RRC configuration stored in a UE access context are used.

For an information element PDCP config in the RRC configuration stored by the UE, for those fields that are present in the default PDCP configuration, such as primaryPath or pdcp-Duplication described above, configured values of these fields in the default PDCP configuration may be used, and for those fields that are not present in the default PDCP configuration, such as a PDCP-SN length value or parameters such as a PDCP integrity protection parameter etc., original values of these fields in the RRC configuration stored in the UE access context are used.

After the UE restores the RRC configuration by using the above method, PDCP entities or RLC entities may be reestablished, and then all DRBs are resumed. Then, the RRC connection resume request message is submitted to a lower layer for transmission/sending.

Another implementation of the foregoing solution may be as follows:

When the RRC connection resumption procedure is triggered, the UE restores all RRC configurations, and then uses the value set in the default RLC bearer configuration for the field that is present in the default RLC bearer configuration, and may also use the value set in the default PDCP configuration for the field that is present in the default PDCP configuration. In this manner, the UE restores the RRC configurations. Then, PDCP entities or RLC entities may be reestablished, and then all DRBs are resumed. Then, the RRC connection resume request message is submitted to a lower layer for transmission/sending.

Embodiment 2

This embodiment differs from Embodiment 1 in that the UE does not resume all DRBs, but resumes only a DRB using a small data transmission scheme.

The "DRB using a small data transmission scheme" is a dedicated DRB, and one or more such DRBs may be present.

RRC configuration message received by the UE in the connected state may include DRB configuration information, and it is indicated in the DRB configuration information that the DRB may be used for small data transmission. Such indication information may be associated with a DRB ID (drb-Identity), or may be associated with a logical channel ID.

In particular, such indication information may be added to RLC-BearerConfig. Since RLC-BearerConfig further includes logicalChannelIdentity and drb-Identity, such indication information may be considered to be associated with the logical channel ID or the DRB ID.

When an RRC connection resumption procedure is triggered, UE restores RRC configurations, but does not restore all RRC configurations, and instead, restores relevant configurations of those DRBs that support or may be used for small data transmission. In addition, PDCP entities or RLC entities are reestablished for those DRBs that support or may be used for the small data transmission, and then all DRBs that may be used for the small data transmission are resumed.

After DRB resumption, the UE submits the RRC connection resume request message to the lower layer for transmission/sending.

Embodiment 3

UE transmits request information to a base station or a network side, requesting resource configuration for small data transmission, or requesting to perform small data transmission, or the like. The request message carries at least relevant information of a DRB, such as drb-Identity or information of a logical channel associated with the DRB, such as a logical channel ID. The DRB carried in the request information is a DRB for small data transmission in an inactive state.

In the case that the base station or the network side fully accepts the request from the UE, it may be considered that all DRBs indicated by the UE in the request information may be used for small data transmission.

In the case that the base station or the network side partially accepts the request from the UE, response information for the request message may carry DRB information, such as drb-Identity, and a DRB indicated in the response information may be used for the small data transmission.

In addition, upon receiving the request, the base station or the network side may use an existing RRC configuration procedure to reconfigure the DRBs, so that the DRBs are suitable for data transmission in the inactive state.

When the UE enters the inactive state and when small data transmission needs to be performed, an RRC connection resumption procedure is triggered, and UE restores RRC configurations, but does not restore RRC configurations of all DRBs, and instead, restores relevant RRC configurations of those DRBs that may be used for small data transmission. In addition, PDCP entities or RLC entities are reestablished for those DRBs that may be used for the small data transmission, and then all DRBs that may be used for the small data transmission are resumed. The DRBs that may be used for the small data transmission herein are one or more or all of the DRBs previously indicated by the UE in the request information or a response message of the request message.

After DRB resumption, the UE submits the RRC connection resume request message to the lower layer for transmission/sending.

Embodiment 4

In Embodiment 2, when one DRB is configured to support small data transmission, one situation may be that the DRB can perform the small data transmission in an inactive state, and can also perform normal data transmission in the connected state.

In this embodiment, alternatively, the UE may be configured with one or more dedicated DRBs for small data transmission. This or these dedicated DRBs are only used for the small data transmission in the inactive state, and when the UE enters the connected state, this or these DRBs may be in a suspended state.

When data of an upper layer arrives, an SDAP layer transmits the data to different DRBs according to a Qos flow and DRB mapping relationship (a QoS flow to DRB mapping rule: for determining which DRB is to bear a Qos flow packet). In order to enable this dedicated DRB to operate properly, if the UE receives an SDAP SDU from the upper layer, then an SDAP entity needs to determine whether the UE is in the inactive state. If the UE is in the inactive state, then the SDAP entity maps or transmits the SDAP SDU to this dedicated DRB. If the UE is not in the inactive state, but is in the connected state, and if the Qos flow to DRB mapping rule is not present, then the SDAP entity maps or transmits the SDAP SDU to a default DRB, or if the Qos flow to DRB mapping rule is present, then the SDAP SDU is mapped or transmitted to a corresponding DRB according to this rule.

Therefore, in the inactive state, no matter whether the Qos flow to DRB mapping rule is present, an SDAP SDU from the upper layer is always transmitted to a dedicated DRB for small data transmission.

In a special situation, in the inactive state, when at least two dedicated DRBs are present, a rule for an active state may be followed, and an SDAP SDU is transmitted to one of the dedicated DRBs according to the preconfigured Qos flow to DRB mapping rule. If the Qos flow to DRB mapping rule is not present, then the SDAP SDU is transmitted to the other one of the dedicated DRBs, or a default dedicated DRB is defined.

When the UE enters the inactive state and needs to perform small data transmission, an RRC connection resumption procedure is triggered, and the UE restores RRC configurations, but does not restore RRC configurations of all DRBs, and instead, restores relevant RRC configurations of those DRBs or that DRB that may be used for small data transmission. In addition, PDCP entities or RLC entities are reestablished for those DRBs or that DRB that may be used for the small data transmission, and then the DRB that may be used for the small data transmission is resumed. The DRB that may be used for the small data transmission herein is a configured dedicated DRB.

After DRB resumption, the UE submits the RRC connection resume request message to the lower layer for transmission/sending.

Embodiment 5

On the basis of Embodiments 2 to 4, when determining whether small data transmission can be performed, the UE needs to determine whether the data from the upper layer is from those DRBs or that DRB that may be used for small data transmission. The UE can perform small data transmission only when at least this condition is met, that is, the data from the upper layer is from those DRBs or that DRB that may be used for small data transmission, or otherwise, the UE does not perform small data transmission.

Figure 3:
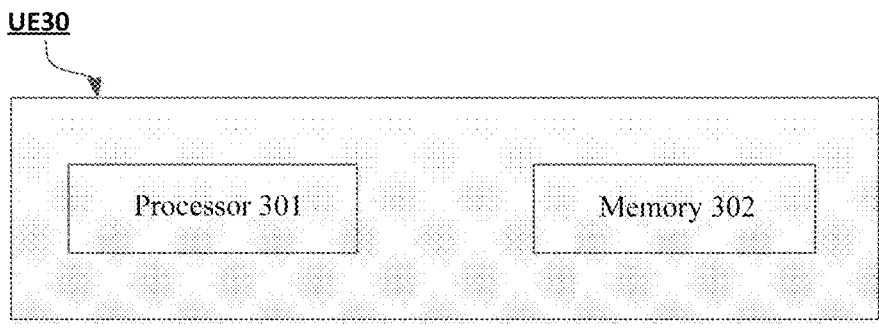
FIG. 3 shows a block diagram of user equipment 30 according to an embodiment of the present invention.

FIG. 3 is a block diagram of user equipment 30 according to an embodiment of the present invention. As shown in FIG. 3, the user equipment 30 includes a processor 301 and a memory 302. The processor 301 may include, for example, a microprocessor, a microcontroller, an embedded processor, and the like. The memory 302 may include, for example, a volatile memory (for example, a random access memory (RAM)), a hard disk drive (HDD), a non-volatile memory (for example, a flash memory), or other memory systems. The memory 302 stores program instructions. The instructions, when run by the processor 301, can perform the aforementioned method in the user equipment described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals). The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuits may be digital circuits or analog circuits. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A method performed by user equipment, comprising:
receiving a Radio Resource Control (RRC) message includes data radio bearer (DRB) identities for DRBs configured for small data transmission (SDT), wherein one of the DRB identities identifies a DRB configured for SDT and used for data transmission in an RRC connected state,
initiating an RRC resumption procedure for SDT in a case that the following condition (1) and condition (2) are fulfilled:
the condition (1) is that data provided by an upper layer for transmission is from the DRBs configured for SDT, and
the condition (2) is that the upper layer requests resumption of an RRC connection,
in a case that the RRC resumption procedure for SDT is triggered, restoring configurations for the DRBs configured for SDT,
re-establishing Packet Data Convergence Protocol (PDCP) entities for the DRBs configured for SDT,
resuming the DRBs configured for SDT, and
submitting an RRC Resume Request message for transmission to lower layers.

2. User equipment, comprising:
a processor; and
a memory in electronic communication with the processor,
wherein instructions stored in the memory are executable to:
receive a Radio Resource Control (RRC) message includes data radio bearer (DRB) identities for DRBs configured for small data transmission (SDT), wherein one of the DRB identities identifies a DRB configured for SDT and used for data transmission in an RRC connected state,
initiate an RRC resumption procedure for SDT in a case that the following condition (1) and condition (2) are fulfilled:
the condition (1) is that data provided by an upper layer for transmission is from the DRBs configured for SDT, and
the condition (2) is that the upper layer requests resumption of an RRC connection,
in a case that the RRC resumption procedure for SDT is triggered, restore configurations for the DRBs configured for SDT,
re-establish Packet Data Convergence Protocol (PDCP) entities for the DRBs configured for SDT,
resume the DRBs configured for SDT, and
submit an RRC Resume Request message for transmission to lower layers.

* * * * *